United States Patent
De Ruyter

(10) Patent No.: US 8,716,651 B2
(45) Date of Patent: May 6, 2014

(54) CALIBRATION SYSTEM FOR DETECTOR

(75) Inventor: Howard M. De Ruyter, Torrance, CA (US)

(73) Assignee: Raytheon Company, Waltham, MA (US)

( * ) Notice: Subject to any disclaimer, the term of this patent is extended or adjusted under 35 U.S.C. 154(b) by 421 days.

(21) Appl. No.: 13/212,875

(22) Filed: Aug. 18, 2011

(65) Prior Publication Data
US 2013/0043390 A1 Feb. 21, 2013

(51) Int. Cl.
*G01D 18/00* (2006.01)

(52) U.S. Cl.
USPC ........................................................ 250/252.1

(58) Field of Classification Search
USPC ..................................................... 250/252.1
See application file for complete search history.

(56) References Cited

U.S. PATENT DOCUMENTS

| | | |
|---|---|---|
| 3,576,944 A | 5/1971 | LaBaw |
| 5,311,273 A | 5/1994 | Tank et al. |
| 5,343,040 A | 8/1994 | Wiese et al. |
| 5,716,030 A | 2/1998 | LaFiandra et al. |
| 7,592,588 B2 | 9/2009 | Moskun et al. |
| 2012/0143551 A1 * | 6/2012 | Burkland et al. ............. 702/104 |

FOREIGN PATENT DOCUMENTS

| | | |
|---|---|---|
| JP | H 0672400 | 3/1994 |
| JP | 2005/106642 | 4/2005 |

* cited by examiner

*Primary Examiner* — David Porta
*Assistant Examiner* — Hugh H Maupin
(74) *Attorney, Agent, or Firm* — Thorpe North & Western LLP

(57) ABSTRACT

A calibration system for a detector includes a base member, a plurality of radiation sources fixedly attached to the base member, and a positioning mechanism attached to the base member. Each radiation source is maintained at a different temperature and is configured to emit electromagnetic radiation. The positioning mechanism includes a movable member having a single degree of freedom with respect to the base member, and a plurality of optical elements arranged on the movable member. Each optical element corresponds to one of the radiation sources and each optical element is configured to at least be movable between a calibration position and a non-calibration position. When the optical element is in the calibration position, the optical element is configured to receive the electromagnetic radiation from its corresponding radiation source and to reflect the electromagnetic radiation to a detector.

16 Claims, 4 Drawing Sheets

(BACKGROUND)

(BACKGROUND)

CALIBRATION SYSTEM FOR DETECTOR

GOVERNMENT RIGHTS

The present disclosure was made with U.S. Government support under a classified contract awarded by [federal agency withheld]. The U.S. Government may have certain rights in the present disclosure.

BACKGROUND

The present disclosure relates to a calibrating system for an infrared (IR) sensor or any broadband detector responsive to electromagnetic radiation from varying radiation source types.

Detectors typically include an array of pixels, each pixel being operable to generate or pass a current in response to electromagnetic energy incident upon the pixel. In most cases the generated or passed current is proportional to the incident energy.

These pixels are prone to some fluctuation in their response behavior over the life of the detector. Regular calibration is typically desirable so as to ensure uniformity in measurements. It is important to know the relative operation performance of the pixels relative to themselves. An unknown change in performance could lead to erroneous data regarding measurements of an electromagnetic energy source. As such, calibration is used to correct for pixel to pixel variations, such as a non-uniformity correction, and changes in the pixel response over time.

Typically, the calibration is accomplished by placing source(s) at or near the detector. The source illuminates the detector. Although calibration in a laboratory environment is typically performed before deployment, regular re-calibration after deployment is highly desired for the reasons stated above.

As detector assemblies of this type are frequently used in space based devices, a complex calibration system is quite undesirable. Size and weight are ever present factors in the cost of assembly and launch. The greater one component is in terms of size and weight, generally the smaller some other component must be.

Further, the system must also be designed to withstand the forces encountered during launch and deployment and then repeated operation requests without being easily serviceable. There are also a number of existing elements that are highly desired for detector functionality, such as spectral filter wheels and guidance systems. Options to provide calibration without compromising existing systems has proven challenging as well.

FIGS. 1 and 2 illustrate conventional system 100 used for calibrating detector 102. FIG. 1 illustrates system 100 in a non-calibration mode of operation, while FIG. 2 illustrates calibration system 100 in a calibration mode of operation.

System 100 includes source assembly 108 having one or more light sources 112 (e.g., light sources 112A-C), mirror 110 and detector 102. Light source 112 is configured to emit light. Mirror 110 is configured to receive the light from source 112 and redirect or reflect the light to detector 102.

System 100 also includes two mechanisms that are used for calibrating detector 102. These mechanisms include source assembly rotation mechanism 104 and mirror rotation mechanism 106. Source assembly rotation mechanism 104 rotates or moves light source 112 to illuminate mirror 110 and thus detector 102. That is, source assembly rotation mechanism 104 directs the Field of View (FOV) of detector 102 at source 112. Mirror rotation mechanism 106 rotates or moves mirror 110 into the incoming light path from source 112 so that mirror 110 receives the light from source 112, and redirects that light onto detector 102.

During calibration mode of system 100, as shown in FIG. 2, source 112B is moved or rotated by source assembly rotation mechanism 104, and mirror 110 is moved or rotated by mirror rotation mechanism 108 such that the light emitted by source 112B is received by mirror 110, and the received light is reflected by mirror 110 onto detector 102. Also, during calibration mode, source 112A and mirror 110 are moved or rotated such that the light emitted by source 112A is received by mirror 110 and reflected by mirror 110 onto detector 102, while source 112C and mirror 110 are moved or rotated such that the light emitted by source 112C is received by mirror 110 and reflected by mirror 110 onto detector 102.

These two discrete mechanisms (i.e., source assembly rotation mechanism 104 and mirror rotation mechanism 106) used for calibrating detector 102 add complexity to system 100 and introduce additional reliability concerns over a single mechanism.

Embodiments of the present disclosure provides improvements over the conventional calibrating systems.

SUMMARY

One embodiment relates to a calibration system for a detector. The calibration system includes a base member, a plurality of radiation sources fixedly attached to the base member, and a positioning mechanism attached to the base member. Each radiation source is maintained at a different temperature and is configured to emit electromagnetic energy. The positioning mechanism includes a movable member having a single degree of freedom with respect to the base member and a plurality of optical elements arranged on the movable member. Each optical element corresponds to one of the radiation sources and each optical element is configured to at least be movable between a calibration position and a non-calibration position. When the optical element is in the calibration position, the optical element is configured to receive the electromagnetic energy from its corresponding radiation source and to reflect the electromagnetic energy to a detector.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

As noted in the background section of the present application, the conventional calibrating systems have at least two degree of freedom mechanisms. That is, the conventional calibrating systems use two distinct mechanisms to calibrate the detector. One mechanism moves the mirror into incoming optical path (i.e., from source) and another mechanism moves or rotates source(s). These two discrete mechanisms add complexity to the calibrating system and introduce additional reliability concerns beyond that of a single mechanism.

The present disclosure provides a calibrating system having only one, single degree of freedom mechanism. This single degree of freedom mechanism moves or rotates a member having very small optics so that the optics point to stationary black bodies. The paddle wheel calibrator proposed in the present application, thus, reduces the complexity of the calibrating system by maintaining stationary black bodies and eliminating a second mechanism.

Figure 1:
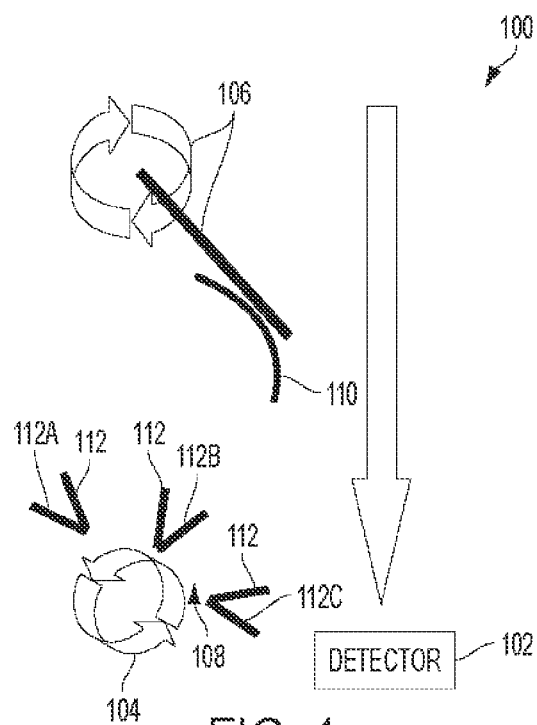
FIG. 1 illustrates a conventional system for calibrating a sensor, wherein the system is in a non-calibration mode of operation.
Figure 2:
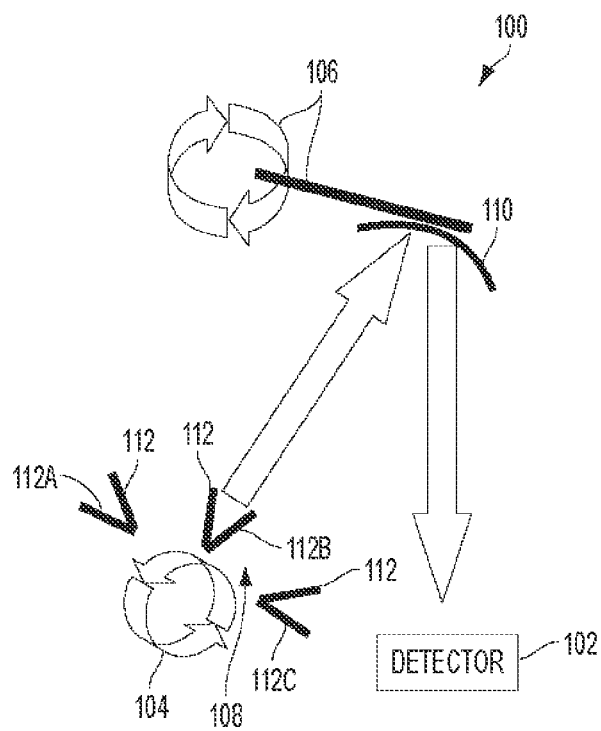
FIG. 2 illustrates the conventional calibrating system of FIG. 1 in a calibration mode of operation.
Figure 3:
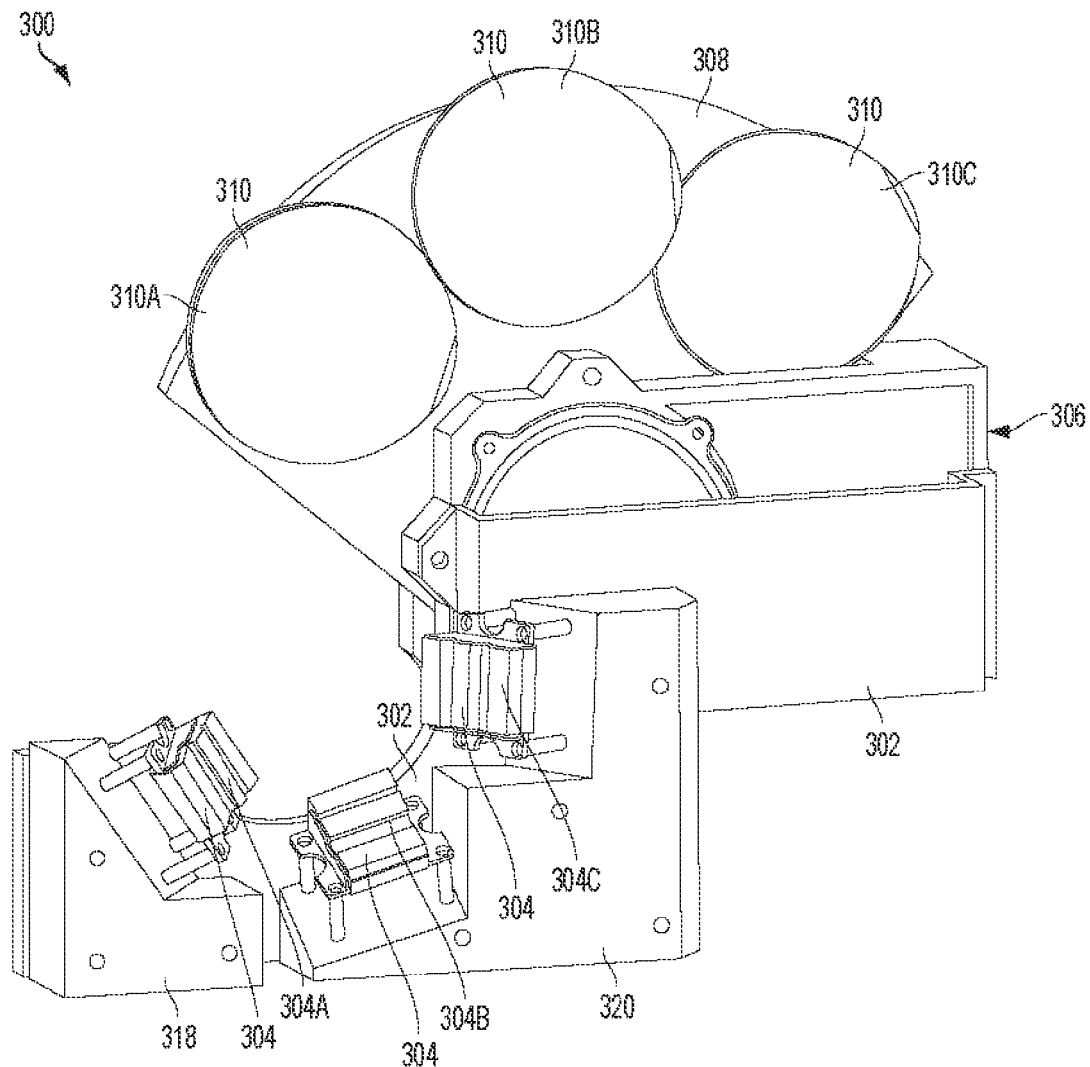
FIG. 3 illustrates a calibrating system for a detector in accordance with an embodiment of the present disclosure.
Figure 4:
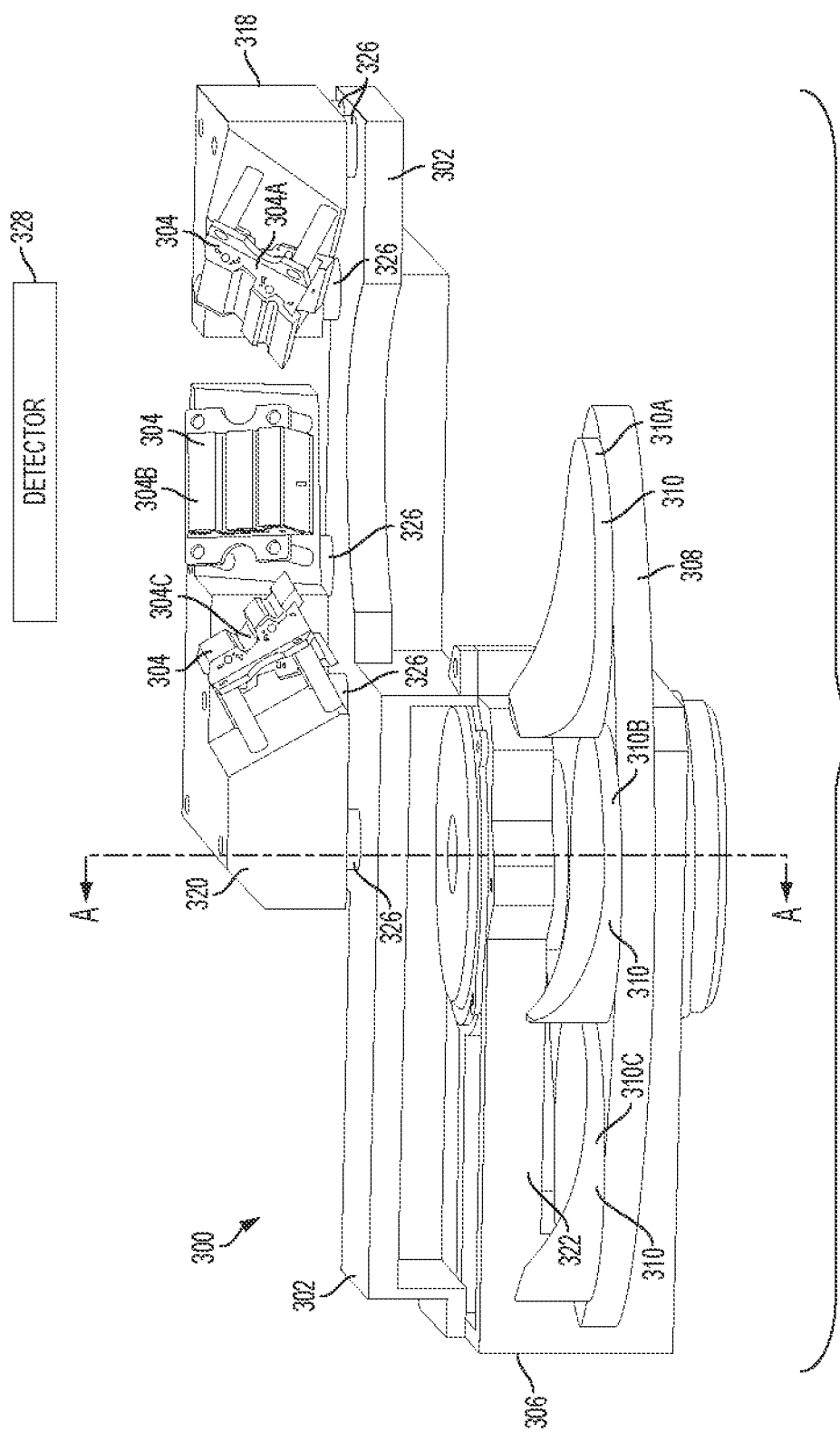
FIG. 4 illustrates another view of the calibrating system of FIG. 3.

FIGS. 3 and 4 illustrate calibrating system 300 for detector 328 in accordance with an embodiment of the present disclosure.

In one embodiment, detector 328 is an infrared (IR) sensor configured to be responsive to an infrared radiation. Such infrared (IR) sensor may be configured to be responsive to mid wavelength infrared radiation, short wave infrared radiation, or long-wavelength infrared radiation. For example, detector 328 may be a mid-wave infrared (IR) sensor configured to be responsive to mid-wave infrared radiation.

In another embodiment, detector 328 may be configured to be responsive to the electromagnetic radiation from different types of radiation sources. For example, detector may include a detector configured to be responsive to visible light or a hyperspectral detector. Detector 328 may be a visible detector configured to be responsive to the electromagnetic radiation from different visible sources. As will be explained in detail below, different types of radiation sources may include, for example, visible light radiation source, infrared radiation source, and black body radiation source.

Calibration system 300 includes base member 302, plurality of radiation sources 304 fixedly attached to base member 302, and positioning mechanism 306 attached to base member 302. Each radiation source 304 may be maintained at a different temperature and configured to emit electromagnetic energy. Positioning mechanism 306 includes movable member 308 having a single degree of freedom with respect to base member 302 and plurality of optical elements 310 arranged on movable member 308. Each optical element 310 corresponds to one of the radiation sources 304, and each optical element 310 is configured to at least be movable between a calibration position and a non-calibration position. When optical element 310 is in the calibration position, optical element 310 is configured to receive the electromagnetic radiation or energy from its corresponding radiation source 304 and to reflect the electromagnetic radiation or energy to detector 328.

Each radiation source 304 is positioned such that detector 328 receives the electromagnetic radiation or energy emitted from radiation source 304 via its corresponding optical element 310. Each radiation source 304 may be any source of electromagnetic radiation or energy capable of emitting a sufficient amount of electromagnetic radiation or energy for detection by detector 328.

Plurality of radiation sources 304 may include two different types of radiation sources. Different types of radiation sources may include visible light radiation source, shortwave infrared radiation source, and long wavelength radiation source. For example, the visible light radiation sources are configured to provide visible (VIS) or visible-near (VIS/NIR) radiation. The infrared radiation sources are configured to provide short wavelength infrared radiation (SWIR), mid-wavelength infrared radiation (MWIR), long wavelength infrared radiation (LWIR) and/or very long wavelength infrared (VLWIR) radiation.

Each radiation source 304 may emit radiation having a wavelength of visible light or a wavelength longer than that of visible light. For example, each radiation source 304 may emit radiation having a wavelength in the range of 390 nanometers (nm) to 300 micrometers (μm). In one embodiment, each radiation source 304 may include a blackbody (e.g., heated filament) source. In another embodiment, each radiation source 304 may include Light Emitting Diodes (LEDs), laser diodes, and/or combinations thereof.

In one embodiment, plurality of different radiation sources 304 is used to provide uniform pixel illumination of detector 328. Only one radiation source can be used at any one time, but multiple simultaneous sources are typically not required for uniformity calibrator. The plurality of radiation sources 304 may include two or more blackbody sources 304. In the illustrated embodiment, as shown in FIGS. 3 and 4, the plurality of radiation sources 304 include three blackbody sources 304A-C.

Each radiation source 304 may be maintained at a different temperature. For example, three blackbody sources 304A-C, in the illustrated embodiment, may be a relatively hot blackbody source 304C maintained within a temperature range of 350K-420K, an ambient blackbody source 304B maintained within a temperature range of 290K-310K and a relatively cold blackbody source 304A maintained within a temperature range of 250K-275K. In one embodiment, ambient blackbody source 304B is maintained at a temperature range that is between the temperature range of the relatively hot blackbody source 304C and the relatively cold blackbody source 304A. In one embodiment, each blackbody source 304A-C may be 0.75 inches long and 1.1 inches wide. In another embodiment, each black body source 304A-C may be of different sizes.

Each radiation source 304 is fixedly attached to base member 302. That is, each radiation source 304 is arranged to be stationary relative to its optical element 310.

This arrangement in which the radiation sources are maintained stationary relative to its optical elements is configured to reduce the power supply required to heat the hot radiation source and to reduce the amount of cooling for the cold radiation source. For example, in one embodiment, the discrete radiation sources are made of thermally conductive material (e.g., Aluminum or Copper) and are coated black (painted or otherwise coated). The temperature and thermal gradients of these discrete radiation sources are tightly controlled and measured. Since the temperature of the radiation sources are at either above or below an environmental temperature, thermal cooling or heating is desired to maintain the temperature of these radiation sources. In a vacuum, conduction is one of the most efficient methods of thermal heat transfer. Radiation, which is significantly less efficient than conduction, takes its place after the conduction. Since the thermal connection between the radiation sources and their thermal interfaces is conductive, in the case of the hot radiation source, the required power to heat the radiation source is reduced. In the case of the cold radiation source, the thermal interface temperature to the radiation source does not need to be as cold as if it were connected radiatively (e.g., via a radiative link) as would be the case if the black bodies were on a rotation stage. Therefore, maintaining stationary black bodies (radiation sources) is more efficient for power and cooling.

In one embodiment, radiation sources 304A-C are fixedly attached to base member 302 via members 318 and 320. That is, radiation sources 304A-C are fixedly attached to members 318 and 320, which in turn are fixedly attached to base member 302. Member 318 is also configured to act as a thermal interface between cold blackbody source 304A and a cryoradiator (not shown). Member 320 is configured to act as a thermal interface between ambient blackbody source 304B and hot blackbody source 304C to a radiator. Member 318 is generally referred to as a cold thermal interface and member 320 generally referred to hot thermal interface.

In one embodiment, there are limitations to how much power various radiator interfaces reject, the segregation of these radiator interfaces allows for a single more efficient radiator ("cold") to be used to passively cool cold black body source 304A. Member 320 may be used to attach warm black body source 304B and hot black body source 304C to a less efficient, warm radiator.

The radiation sources 304 are fixedly attached to base member 302 by any suitable thermally isolative attachment mechanisms as would be appreciated by one skilled in the art. In one embodiment, the attachment mechanism includes, but not limited to, welding, interlocking fitting, friction fitting, or adhesive bonding.

Referring to FIG. 4, plurality of thermal isolators 326 is disposed between member 318 and base member 302 and between member 320 and base member 302. Due to its connection to a source selection mechanism motor, which generates heat during operation, base member 302 is generally at a different temperature than cold and hot radiator thermal interfaces 318 and 320. The thermal isolators 326 are configured to minimize the heat transfer from base member 302 to cold radiator thermal interface or member 318 and the heat transfer from base member 302 to hot radiator thermal interface or member 320. One example of thermal isolator 326 may be G-10 isolator. In another embodiment, these thermal isolators 326 may be formed from any material having poor thermal conductivity. Thermal isolators 326 may be configured to provide different thermal insulation between member 318 and base member 302 and between member 320 and base member 302.

Positioning mechanism 306 includes movable member 308 having a single degree of freedom with respect to base member 302 and plurality of optical elements 310 arranged on movable member 308.

As used herein, single degree of freedom may refer to either translation of movable member 308 along only one direction (i.e., linear or axial motion or movement of movable member 308 along only one axis) or rotation of movable member 308 about only one axis. The six degrees of freedom are generally defined as axial or linear motion along the X, Y and Z axes, and rotation around each of these axes. In the illustrated embodiment, movable member 308 has a single degree of freedom that provides rotation of movable member 308 about one axis. However, it is contemplated that movable member 308 may have a single degree of freedom that provides a linear or an axial movement of movable member 308 along any one of the X, Y and Z axes.

In one embodiment, movable member 308 is rotatable with respect to an axis A-A (shown in FIG. 4) that passes through base member 302.

In one embodiment, movable member 308 may be in the form of a partial-disk shaped structure. In one embodiment, movable member 308 may be a quarter-disk shaped structure. In another embodiment, movable member 308 may be half-disk shaped structure.

Optical elements 310 are arranged on movable member 308. Each optical element 310 corresponds to one of the radiation sources 304, and each optical element 310 is configured to at least be movable between a calibration position and a non-calibration position.

In one embodiment, each optical element 310 includes a faceted configuration. This faceted mirrored optic configuration of optical element 310 allows the calibration system of the present disclosure to be used across a wide range of the electromagnetic spectrum, including, visible (VIS), visible-near (VIS/NIR), short wavelength infrared (SWIR), mid-wavelength infrared (MWIR), long wavelength infrared (LWIR) and very long wavelength infrared (VLWIR).

In one embodiment, plurality of optical elements 310 may include two or more optical elements. In the illustrated embodiment, as shown in FIGS. 3 and 4, plurality of optical elements 310 include three optical elements 310A-C. For example, optical elements 310A, 310B, and 310C correspond blackbody sources 304A, 304B, and 304C, respectively. The number of optical elements 310 in system 300 may be made equal to the number of blackbody or radiation sources desired for calibration and is not limited to three Optical element 310 may be a powered optical element. In one embodiment, optical element 310 may be a positively powered optical element configured to focus radiation energy from blackbody source 304 so that the radiation is uniformly received by detector 328.

In one embodiment, optical elements 310A, 310B, and 310C may have the same shape, size, optical power and/or other characteristics. In another embodiment, optical elements 310A, 310B, and 310C may have different shape, size, optical power and/or other characteristics.

In one embodiment, optical elements 310A, 310B, and 310C may be customized for each blackbody position in order to minimize potential optical aberrations to allow all three black bodies to be identical in shape and size at each position.

As will be explained in detail with respect to FIGS. 6-8, when optical element 310 is in the calibration position, optical element 310 is configured to receive the electromagnetic radiation or energy from its corresponding radiation source 304 and to reflect the electromagnetic radiation or energy to detector 328.

In contrast to the conventional approaches, paddle wheel or movable member 308 only requires temperature sensors behind each of the optical elements 310A-C. This is mainly because radiation sources 304 are not attached to and are not moving with respect to movable member 308. If the radiation sources were attached to member 308, a significant wire count for heaters and temperature sensors would be required to pass over the rotation axis of movable member 308 in the form of a cable wrap. The reduction of power and signal wires over the cable wrap simplifies the cable wrap design.

System 300 also includes a plurality of dividers (not shown). Each divider is disposed between two optical elements 310 so that each radiation source illuminates its corresponding optical element only and does not illuminate any other optical element. For example, as shown in FIG. 6, optical element 310A is only illuminated by blackbody source 304A and not by sources 304B or 304C Positioning mechanism 306 also includes motor and resolver assembly 322. Movable member 308 is operatively connected to motor and resolver assembly 322.

The motor is configured to vary the position of movable member 308 with respect to base member 302. In one embodiment, the motor may be a stepper motor configured to supply a drive force and to facilitate variable positioning of the movable member 308. In one embodiment, the motor is operational under the direction of a control system (not shown) to move or rotate movable member 308 for calibration purposes. Motor and resolver assembly 322 may include an actuator coupled to receive the drive force from the motor to move or rotate movable member 308 for calibration purposes.

Motor and resolver assembly 322 may also include a resolver that is configured to sense the position of the motor, e.g., rotational position, and to determine the position of movable member 308. The resolver may send the positional information of movable member 308 to the control system, which in response controls the operation of the motor.

Figure 5:
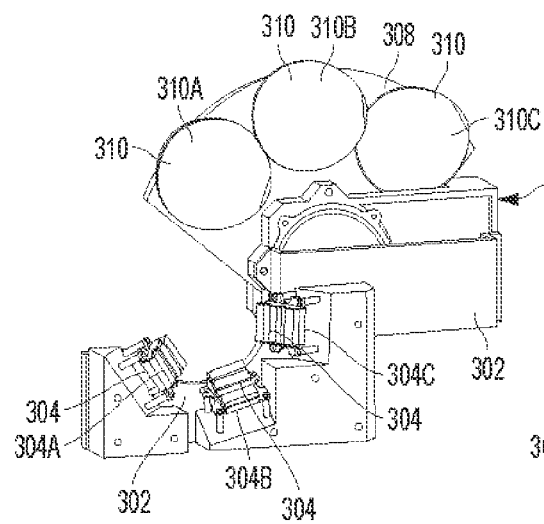
FIG. 5 illustrates the calibrating system of FIG. 3, wherein movable member and its optical elements are in a stowed position and in a non-calibration mode of operation in accordance with an embodiment of the present disclosure.

FIG. 5 illustrates calibrating system 300, wherein movable member 308 and its optical elements are in a stowed position and in a non-calibration mode of operation in accordance with an embodiment.

When optical elements 310A, 310B, and 310C are not calibrating, paddle or movable member 308 is moved out of the optical path. That is, when optical elements 310A, 310B, and 310C are not calibrating, paddle or movable member 308 and its optical elements 310A, 310B, and 310C are stowed in a protective environment (e.g., inside a cover (not shown)). This allows for greater thermal stability of optical elements 310A, 310B, and 310C by controlling the thermal environment that the optical elements experience in between calibrations.

Figure 6:
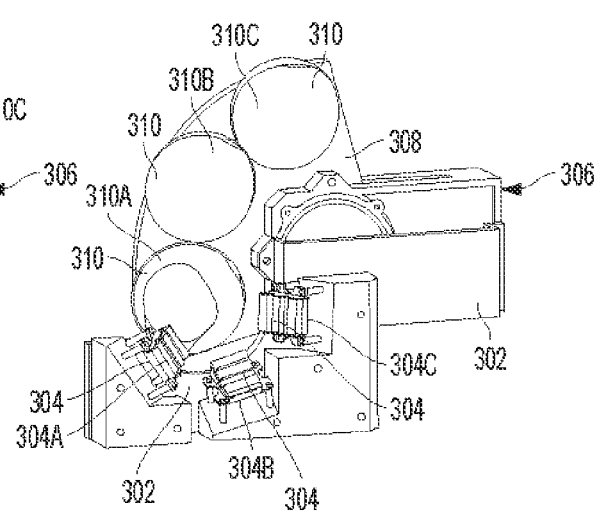
FIG. 6 illustrates the calibrating system of FIG. 3, wherein the movable member is in an operational position with a first optical element in a calibration mode of operation in accordance with an embodiment of the present disclosure.

FIG. 6 illustrates the calibrating system of FIG. 3, wherein movable member 308 is in a first operational position with first optical element 310A in a calibration mode of operation in accordance with an embodiment.

As shown in FIG. 6, calibration is initiated by rotating movable member 308 into the first operational position. The motor and resolver assembly 320 are configured to move or rotate movable member 308 into the first operational position.

When movable member 308 is in the first operational position, as shown in FIG. 6, optical element 310A is configured to receive the electromagnetic energy from its corresponding radiation source 304A and to reflect the electromagnetic radiation or energy to detector 328 (shown in FIG. 4). That is, optical element 310A and its corresponding radiation source 304A are in calibration mode of operation, while optical elements 310B and 310C and its corresponding radiation sources 304B and 304C are in non-calibration mode of operation. The divider disposed between two optical elements 310A and 310B and the divider disposed between optical elements 310B and 310C allows the optical element 310A only to be illuminated by its corresponding blackbody source 304A, and not illuminated by other blackbody sources 304B and 304C. During the calibration process, as illustrated in FIG. 6, only movable member 308 (along with its optical elements) is moved, while blackbody sources 304A-C remain stationary.

Figure 7:
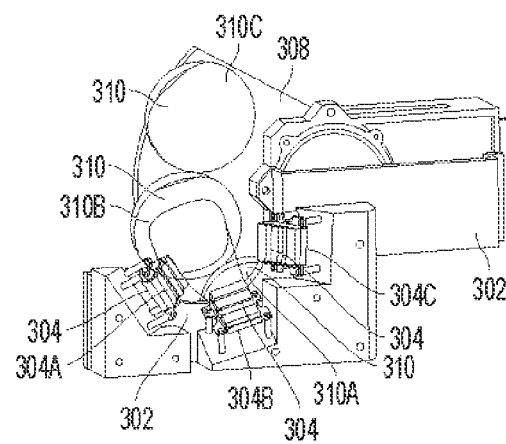
FIG. 7 illustrates the calibrating system of FIG. 3, wherein the movable member is in the operational position with a second optical element in a calibration mode of operation in accordance with an embodiment of the present disclosure.

FIG. 7 illustrates the calibrating system of FIG. 3, wherein movable member is in a second operational position with second optical element 310B in a calibration mode of operation in accordance with an embodiment.

Movable member 308 is rotated or moved from the first operational position, as shown in FIG. 6, to the second operational position, as shown in FIG. 7. In one embodiment, movable member 308 is rotated approximately 45° from the first operational position to the second operational position. The motor and resolver assembly 320 configured to move or rotate movable member 308 to the second operational position.

When movable member 308 is in the second operational position, as shown in FIG. 7, optical element 310B is configured to receive the electromagnetic radiation or energy from its corresponding radiation source 304B and to reflect the electromagnetic radiation or energy to detector 328 (shown in FIG. 4). That is, optical element 310B and its corresponding radiation source 304B are in a calibration mode of operation, while optical elements 310A and 310C and its corresponding radiation sources 304A and 304C are in non-calibration modes of operation. The divider disposed between two optical elements 310A and 310B and the divider disposed between optical elements 310B and 310C allows the optical element 310B only to be illuminated by its corresponding blackbody source 304B, and not illuminated by other blackbody sources 304A and 304C. During the calibration process, as illustrated in FIG. 7, only movable member 308 (along with its optical elements) is moved, while blackbody sources 304A-C remain stationary.

Figure 8:
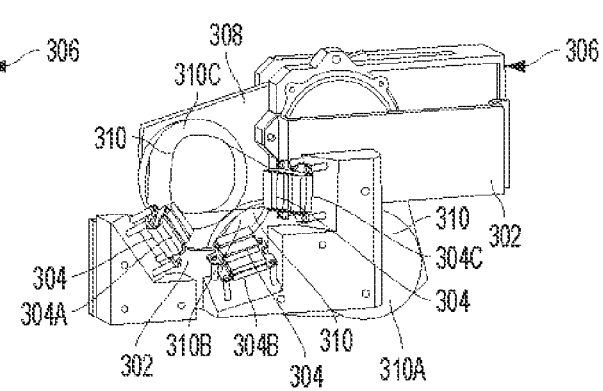
FIG. 8 illustrates the calibrating system of FIG. 3, wherein the movable member is in the operational position with a third optical element in a calibration mode of operation in accordance with an embodiment of the present disclosure.

FIG. 8 illustrates the calibrating system of FIG. 3, wherein movable member 308 is in a third operational position with third optical element 310C in a calibration mode of operation in accordance with an embodiment.

Movable member 308 is rotated or moved from the second operational position, as shown in FIG. 7, to the third operational position, as shown in FIG. 8. In one embodiment, movable member 308 is rotated approximately 45° from the second operational position to the third operational position. The motor and resolver assembly 320 configured to move or rotate movable member 308 to the third operational position.

When movable member 308 is in the third operational position, as shown in FIG. 8, optical element 310C is configured to receive the electromagnetic radiation or energy from its corresponding radiation source 304C and to reflect the electromagnetic radiation or energy to detector 328 (shown in FIG. 4). That is, optical element 310C and its corresponding radiation source 304C are in calibration mode of operation, while optical elements 310A and 310B and its corresponding radiation sources 304A and 304B are in non-calibration mode of operation. The divider disposed between two optical elements 310A and 310B and the divider disposed between optical elements 310B and 310C allows the optical element 310C only to be illuminated by its corresponding blackbody source 304C, and not illuminated by other blackbody sources 304A and 304B. During the calibration process, as illustrated in FIG. 8, only movable member 308 (along with its optical elements) is moved, while blackbody sources 304A-C remain stationary.

After the calibration is performed in the third operational position, movable member 308 may be rotated in the opposite direction by approximately 145° to move movable member 308 into the stowed position (i.e., out of the optical path), as shown in FIG. 5.

In the illustrated embodiment, as shown in FIGS. 3-8, the present application discloses a system with three optical elements and three sources. It is contemplated that principles of the present disclosure may equally applicable to a system having two (or four) optical elements and two (or four) sources. In such a system, movable member may include two (or four) operational positions (instead of three).

In the illustrated embodiment, as shown in FIGS. 3-8, the present application discloses a system that provides rotation of the movable member about one axis. It is contemplated that principles of the present disclosure may be applicable to a system in which the movable member is configured to linearly or axially move along any one of the X, Y and Z axes for calibrating the detector. In such an embodiment, the movable member is translated along one direction or axis into two or more different operational positions. In each operational position, one of the optical elements is configured to receive the electromagnetic radiation or energy from its corresponding radiation source and to reflect the electromagnetic radiation or energy to detector 328.

The calibration system disclosed herein may be used in space applications. For example, such calibration system may be used for on-board calibration of sensors disposed on a spacecraft.

As noted above, the calibration system disclosed in the present application uses only one mechanism, instead of two mechanisms used conventionally, for performing calibration of the detector, such as the infrared sensor or the broadband detector. This may be achieved by rotating powered optical elements into the optical path to look at different stationary black bodies.

Although the present disclosure has been described in detail for the purpose of illustration, it is to be understood that such detail is solely for that purpose and that the inventive concept is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment may be combined with one or more features of any other embodiment.

What is claimed is:

1. A calibration system for a detector, the calibration system comprising:
   a base member;
   a plurality of radiation sources fixedly attached to the base member, each radiation source being maintained at a different temperature or intensity level and configured to emit electromagnetic radiation; and
   a positioning mechanism attached to the base member, the positioning mechanism comprising:
   a movable member having a single degree of freedom with respect to the base member, and
   a plurality of optical elements arranged on the movable member, each optical element corresponds to one of the radiation sources and each optical element is configured to at least be movable between a calibration position and a non-calibration position,
   wherein, when the optical element is in the calibration position, the optical element is configured to receive the electromagnetic radiation from its corresponding radiation source and to reflect the electromagnetic radiation to a detector.

2. The calibration system of claim 1, wherein the plurality of radiation sources includes two or more black body sources.

3. The calibration system of claim 1, wherein the plurality of optical elements includes two or more optical elements.

4. The calibration system of claim 1, wherein each optical element is a powered optical element.

5. The calibration system of claim 1, wherein the fixed positioning of the radiation source with respect to the base member is configured to provide efficient conductive thermal control of the radiation source.

6. The calibration system of claim 2, wherein the plurality of radiation sources includes three black body sources.

7. The calibration system of claim 6, wherein the three black body sources include a relatively hot black body source, a relatively cold black body source and an ambient black body source.

8. The calibration system of claim 1, further comprising a plurality of dividers, wherein each divider is disposed between two optical elements so that each radiation source only illuminates its corresponding optical element.

9. The calibration system of claim 1, wherein the movable member is configured to be movable to a stowed position to provide thermal stability of the optical elements in between calibrations.

10. The calibration system of claim 1, wherein the movable member is rotatable with respect to an axis that passes through the base member.

11. The calibration system of claim 1, wherein the detector is an infrared (IR) sensor configured to be responsive to an infrared radiation.

12. The calibration system of claim 1, wherein the plurality of radiation sources include at least two different types of radiation sources.

13. The calibration system of claim 12, wherein the different types of radiation sources include visible light radiation sources and infrared radiation sources.

14. The calibration system of claim 12, wherein the infrared radiation sources are configured to provide short wavelength infrared radiation (SWIR), mid-wavelength infrared radiation (MWIR), long wavelength infrared radiation (LWIR) and/or very long wavelength infrared (VLWIR) radiation.

15. The calibration system of claim 12, wherein the visible light radiation sources are configured to provide visible radiation or near visible radiation.

16. The calibration system of claim 1, wherein the detector is a visible detector configured to be responsive to the electromagnetic radiation from different visible sources.

* * * * *